(12) United States Patent
Nilssen

(10) Patent No.: US 6,181,085 B1
(45) Date of Patent: Jan. 30, 2001

(54) ELECTRONIC BALLAST WITH OUTPUT CONTROL FEATURE

(76) Inventor: Ole K. Nilssen, 408 Caesar Dr., Barrington, IL (US) 60010

( * ) Notice: Under 35 U.S.C. 154(b), the term of this patent shall be extended for 0 days.

(21) Appl. No.: 08/395,691

(22) Filed: Feb. 22, 1995

(51) Int. Cl.$^7$ .................................................. H05B 37/02

(52) U.S. Cl. ........................... 315/307; 315/224; 315/291; 315/DIG. 5; 315/DIG. 7

(58) Field of Search .................................... 315/307, 224, 315/209 R, 291, 294, 308, DIG. 4, DIG. 5, DIG. 7

(56) References Cited

U.S. PATENT DOCUMENTS

| | | | | |
|---|---|---|---|---|
| 4,127,798 | * | 11/1978 | Anderson | 315/209 R |
| 4,277,728 | * | 7/1981 | Stevens | 315/247 |
| 4,471,269 | * | 9/1984 | Ganser et al. | 315/307 |

* cited by examiner

Primary Examiner—Michael B Shingleton

(57) ABSTRACT

An inverter-type fluorescent lamp ballast is, via a light switch, powered from the power line by way of two power conductors and one control conductor. From the light switch, which contains a switch means as well as an adjustment means, the control conductor is provided with an adjustable-magnitude DC voltage; which DC voltage is referenced to one of the power conductors. At the ballast, the DC voltage is introduced into the ballast circuitry via a diode, thereby to establish within the ballast a control voltage of magnitude substantially equal to the DC voltage. This control voltage is used for controlling the magnitude of the ballast's 30 kHz output current, thereby providing for light output control. The ballast itself is a self-oscillating half-bridge inverter loaded via a series-tuned high-Q LC circuit connected across its output. A pair of fluorescent lamps is series-connected across the tank-capacitor of the LC circuit. The inverter has two bipolar transistors, each driven by an associated saturable current transformer that provides for a transistor ON-time dependent upon the magnitude of an associated bias voltage. One of the transistors has a control arrangement connected in circuit with its associated saturable transformer and is operative to control the magnitude of its associated bias voltage. As the magnitude of this bias voltage is controlled, the magnitude of the lamp current is correspondingly controlled. The magnitude of the bias voltage is controlled as a function of the magnitude of the DC voltage.

19 Claims, 2 Drawing Sheets

ELECTRONIC BALLAST WITH OUTPUT CONTROL FEATURE

BACKGROUND OF THE INVENTION

1. Field of the Invention

The present invention relates to an electronic ballast for gas discharge lamps, particularly of a type wherein ballast power output is continuously controllable by way of an adjustment means on the light switch.

2. Description of Prior Art

Ballasts with controllable power output have been previously described, such as in U.S. Pat. No. 4,677,345 to Nilssen; wherein is described a means for controlling the power supplied to a fluorescent lamp by way of controlling the temperature of a pair of saturable current transformers used for determining the frequency in a self-oscillating half-bridge inverter loaded by way of a high-Q series-resonant LC circuit. The higher the temperature, the lower the resulting power output.

However, in an electronic ballast powered from regular electric utility AC power line voltage, prior art does not provide for a control arrangement wherein ballast output power can be controlled by way of applying a control voltage between a control input terminal and one of the power line conductors, where this control input terminal is galvanically connected with the electronic circuitry of the electronic ballast.

SUMMARY OF THE INVENTION

Objects of the Invention

A basic object of the present invention is that of providing for a cost-effective ballasting means for powering gas discharge lamps.

A more specific object is that of providing for control means in a series-resonance-loaded inverter ballast.

Another more specific object is that of providing an electronic ballast the power output from which may be step-wise or continuously controlled by way of a lighting switch having a manually adjustable control means.

These as well as other objects, features and advantages of the present invention will become apparent from the following description and claims.

Brief Description

An inverter-type fluorescent lamp ballast is, via a light switch (or, more accurately, a light control means) located at a convenient switch point, powered from the power line by way of two power conductors and one control conductor. From the light switch, which contains a power switch means as well as a continuous-range adjustment means, the control conductor is provided with a DC voltage of continuously (or, alternatively, step-wise) adjustable magnitude; which DC voltage is referenced to one of the power conductors.

At the ballast, the adjustable-magnitude DC voltage is introduced into the ballast circuitry via a diode, thereby to establish within the ballast circuitry a control voltage of magnitude substantially equal to the adjustable-magnitude DC voltage. This control voltage is used for controlling the magnitude of the ballast's 30 kHz output current, thereby providing for light output control.

The ballast itself is a self-oscillating half-bridge inverter loaded by way of a series-tuned high-Q LC circuit connected across its output. A pair of fluorescent lamps is series-connected across the tank-capacitor of the LC circuit.

The inverter has two bipolar transistors, each driven by an associated saturable current transformer that provides for a transistor ON-time dependent upon the magnitude of an associated bias voltage.

One of the transistors has a control arrangement connected in circuit with its associated saturable transformer; which control arrangement is operative to control the magnitude of this transistor's bias voltage. As the magnitude of this bias voltage is controlled, the magnitude of the lamp current is correspondingly controlled. The magnitude of the bias voltage is controlled as a function of the magnitude of the adjustable-magnitude DC voltage.

Otherwise, the magnitude of the bias voltage is automatically controlled such that: (a) with the lamps not-yet-ignited, the magnitude of the voltage across the tank-capacitor is maintained at a level about equal to or somewhat higher than the magnitude of the normal lamp operating voltage, except that for 10 milli-seconds once each second the magnitude is increased to a level high enough to cause lamp ignition; and (b) after the lamps have ignited, the magnitude of the lamp current is prevented from exceeding a pre-set maximum level.

DESCRIPTION OF THE PREFERRED EMBODIMENT

Details of Construction

Figure 1:
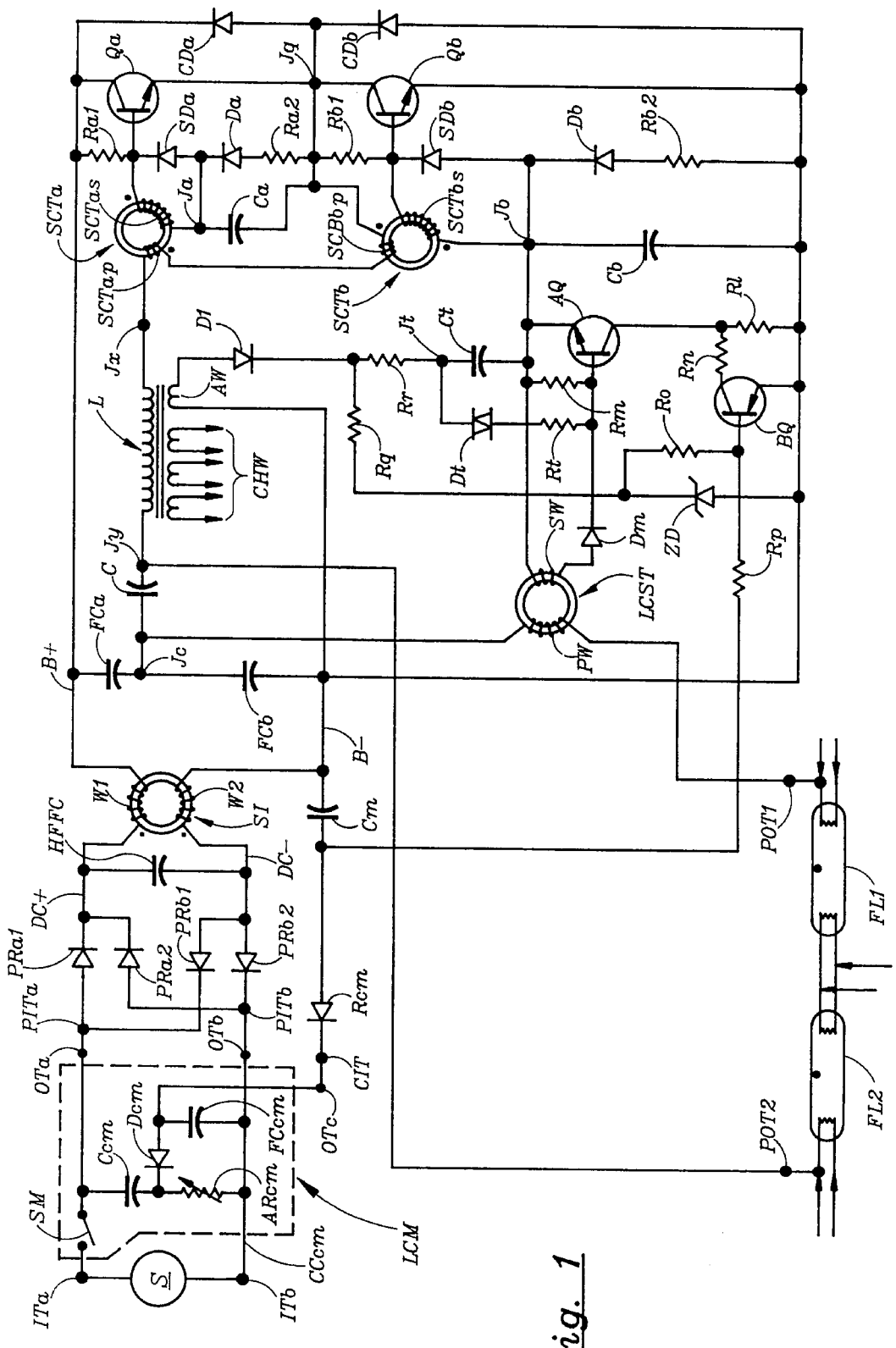
FIG. 1 provides a basic electrical circuit diagram of the preferred embodiment of the invention.

In FIG. 1, the output terminals of a source S of ordinary 120 Volt/60 Hz power line voltage is applied to input terminals ITa and ITb of a light control means LCM; which light control means also has three output terminals: OTa, OTb and OTc. A switch means SM is connected between input terminal ITa and output terminal OTa. A capacitor Ccm is connected between output terminal OTa and the cathode of a diode Dcm. An adjustable resistor ARcm is connected between the cathode of diode Dcm and a common conductor CCcm; which common conductor is connected between input terminal ITb and output terminal OTb. A filter capacitor FCcm is connected between the anode of diode Dcm and common conductor CCcm. The anode of diode Dcm is connected with output terminal OTc.

Output terminal OTa is connected with power input terminal PITa; output terminal OTb is connected with power input terminal PITb; and output terminal OTc is connected with control input terminal CIT.

Power input terminal PITa is connected with the anode of a power rectifier PRa1 and with the cathode of a power rectifier PRb1; and power input terminal PITb is connected with the anode of a power rectifier PRa2 and with the cathode of a power rectifier PRb2. The cathodes of power rectifiers PRa1 and PRa2 are both connected with a positive terminal DC+; the anodes of power rectifiers PRb1 and PRb2 are both connected with a negative terminal DC−. A high-frequency filter capacitor HFFC is connected between the DC+ terminal and the DC− terminal.

A first winding W1 of an EMI suppression inductor SI is connected between the DC+ terminal and a B+ bus; and a second winding W2 of EMI suppression inductor SI is connected between the DC− terminal and a B− bus.

A filter capacitor FCa is connected between the B+ bus and a junction Jc; a filter capacitor FCb is connected between junction Jc and the B− bus. A switching transistor Qa is connected with its collector to the B+ bus and with its emitter to a junction Jq; and a switching transistor Qb is connected with its collector to junction Jq and with its emitter to the B− bus. A commutating diode CDa is connected between the B+ bus and junction Jq, with its cathode connected with the B+ bus; and a commutating diode CDb is similarly connected between junction Jq and the B− bus.

A saturable current transformer SCTa has a secondary winding SCTas connected between the base of transistor Qa and a junction Ja; a saturable current transformer SCTb has a secondary winding SCTbs connected between the base of transistor Qb and a junction Jb. Saturable current transformers SCTa and SCTb, respectively, have primary windings SCTap and OCTbp; which primary windings are series-connected between junction Jq and a junction Jx.

A resistor Ra1 is connected between the collector and the base of transistor Qa; a resistor Rb1 is connected between the collector and the base of transistor Qb. A capacitor Ca is connected between junction Ja and the emitter of transistor Qa; a capacitor Cb is connected between junction Jb and emitter of transistor Qb. A diode Da is connected with its cathode to junction Ja and, by way of a resistor Ra2, with its anode to the emitter of transistor Qa; a diode Db is connected with its cathode to junction Jb and, by way of a resistor Rb2, with its anode to the emitter of transistor Qb. A shunt diode SDa is connected with its cathode to the base of transistor Qa and with its anode to junction Ja; a shunt diode SDb is connected with its cathode to the base of transistor Qb and with its anode to junction Jb. An NPN transistor AQ is connected with its emitter to junction Jb. A resistor R1 is connected between the collector of transistor AQ and the B− bus. A resistor Rn is connected between the collector of transistor AQ and the collector of a PNP transistor BQ, whose emitter is connected with the B− bus.

A resistor Rm is connected between the base of transistor AQ and junction Jb. A resistor Ro is connected between the base of transistor BQ and the cathode of a Zener diode ZD, whose anode is connected with the B− bus. A resistor Rp is connected between the base of transistor BQ and the anode of a rectifier Rcm, whose cathode is connected with control input terminal CIT. A capacitor Cm is connected between the B− bus and the anode of rectifier Rcm.

A tank-inductor L is connected between junction Jx and a junction Jy; and a tank-capacitor C is connected between junctions Jy and Jc. A power output terminal POT1 is connected with junction Jc by way of a primary winding PW of a lamp current sensing transformer LCST; another power output terminal POT2 is connected directly with junction Jy. First and second fluorescent lamps FL1 and FL2 are series-connected between power output terminals POT1 and POT2.

Tank-inductor L has an auxiliary winding AW as well as three cathode heater windings CHW; which heater windings are connected with the cathodes of fluorescent lamps FL1 and FL2. The terminals of auxiliary winding AW are connected between the B− bus and the anode of a diode D1. A resistor Rq connects between the cathode of diode D1 and the cathode of Zener diode ZD.

A capacitor Ct is connected between junction Jb and a junction Jt. A Diac Dt is series-connected with a resistor Rt to form a series-combination, which series-combination is connected between junction Jt and the base of transistor AQ. A resistor Rr is connected between junction Jt and the cathode of diode D1.

Lamp current sensing transformer LCST has a secondary winding SW whose terminals are connected between the junction Jb and the anode of a diode Dm. The cathode of diode Dm is connected with the base of transistor AQ.

Details of Operation

The basic operation of the half-bridge inverter of FIG. 1 is conventional and is explained in conjunction with FIG. 3 of U.S. Pat. No. 4,307,353 to Nilssen.

For a given magnitude of the DC supply voltage, due to the effect of the high-Q LC circuit, the magnitude of the current provided to the fluorescent lamp load (or to any other load presented to the output) is a sensitive function of the frequency and the waveshape of the inverter's output voltage; which output voltage is a substantially squarewave voltage of controllable frequency and with peak-to-peak magnitude about equal to that of the instantaneous magnitude of the DC voltage present between the B− bus and the B+ bus.

The frequency of the inverter's squarewave output voltage is a sensitive function of the natural resonance frequency of the high-Q LC circuit as well as of the duration of the forward conduction period (i.e., the ON-period) of the two inverter switching transistors; which duration, in turn, is a sensitive function of the saturation characteristics of saturable current transformers SCTa and SCTb as combined with the magnitude of the bias voltages present on capacitors Ca and Cb. That is, the duration of the forward conduction period (the ON-time) of each switching transistor is determined by the volt-second product sustainable by its associated saturable current transformer as well as by the magnitude of the negative bias on capacitors Ca and Cb: the higher the volt-second product available before saturation, the longer the ON-time; the higher the negative bias on the Ca/Cb capacitors, the shorter the ON-time.

In the circuit of FIG. 1, the magnitude of the negative voltage on capacitors Ca and Cb is determined by the magnitude of the current provided to the bases of transistors Qa and Qb, less any current drained away through resistors R2a and Rb2/R1/Rn, respectively. (A small amount of current is drained away from bias capacitors Ca and Cb by resistors Ra1 and Rb1, respectively. However, this amount of charge leakage is in most situations negligible. Resistors Ra1 and Rb1 are principally used for getting the inverter to initiate oscillation.)

The magnitude of the base current provided to each transistor is directly proportional to the magnitude of the current flowing through the primary windings of saturable current transformers SCTa and SCTb.

For given values of resistors R2a and Rb2/R1/Rn: the higher the magnitude of the inverter's output current, the higher the magnitude of the negative voltage on capacitors Ca and Cb. Thus, the circuit of FIG. 1 provides for a high degree of regulation of the magnitude of the inverter's output current.

The higher the magnitude of the negative voltage on each bias capacitor, the higher the magnitude of the voltage that has to be provided from the secondary winding of each saturable current transformer; which, in turn, leads to a correspondingly shorter period before saturation is reached. Thus, as the magnitude of the negative bias on each bias capacitor is increased, the duration of each transistor's forward conduction period (ON-time) is decreased; which, in turn, leads to a reduction in the magnitude of the inverter's output current in comparison with what it otherwise would have been.

Whereas the base current provided to each transistor has to flow from its associated bias capacitor, the reverse or reset current provided from each of the saturable current transformer's secondary windings does not flow from the bias capacitor, but rather flows in a separate path through the reverse shunt diode (SDa or SDb) shunting the secondary winding of each saturable current transformer.

More particularly, the circuit and control arrangement of FIG. 1 operates as follows.

As power is applied at power input terminals PITa and PITb, the inverter starts to oscillate at a frequency near the natural self-resonance frequency of the LC circuit. The resulting inverter output current causes a positive feedback current to be provided to each base; and this feedback current, in turn, causes a negative bias to build up on each of bias capacitors Ca/Cb. As the magnitude of the negative bias voltage increases, the inverter's oscillation frequency increases as well. As a result, the magnitude of the inverter output current will stabilize at a some level determined by the effective resistance values of resistors Ra2 and Rb2/R1/Rn as well as the state of conduction of transistors AQ and BQ.

With the fluorescent lamps non-connected or otherwise non-functional, transistor AQ is effectively non-conducting; and under this non-loaded condition the magnitude of the high-frequency (30 kHz or so) inverter current stabilizes at a level determined by the resistance values of resistors Ra2 and Rb2—with the resistance value of resistor Rb2 being the principal determining factor.

With the fluorescent lamps connected and fully operating (i.e., fully loading the LC circuit), transistor AQ is conducting (albeit with a 50% duty cycle) by virtue of the current provided to its base via lamp current sensing transformer LCST. However, absent a control voltage provided at control input terminal CIT, transistor BQ is non-conducting: being biased into its OFF-state by the positive voltage provided to its base from the cathode of Zener diode ZD. Under this condition, the effect of resistor Rb2 (which might typically have a resistance value of about 4700 Ohm) may be neglected becuase it is so much higher than the resistance value effectively represented by resistor R1 (which might typically have a resitance value of about 47 Ohm); and the magnitude of the high-frequency inverter output current stabilizes at a level effectively determined by the resistance value of resistor R1.

With transistor BQ conducting, which it will do as a gradual function of the magnitude of the negative DC voltage provided to control input terminal CIT, additional charge will be leaked off bias capacitor Cb. In fact, the charge-leakage will roughly increase in proportion to the gradual increase in the conduction of transistor BQ, eventually to the point where transistor BQ is fully conductive.

In terms of further explanations: as the resistance value of adjustable resistor ARcm (located within light control means LCM) is increased, the magnitude of the 60 Hz voltage developing across it increases correspondingly, and so does the magnitude of the DC control voltage developing across capacitor FCcm. In this connection, it is noted that capacitor Ccm is of much higher impedance than even the maximum impedance of adjustable resistor ARcm; which means that, in effect, adjustable resistor ARcm is provided with a substantially constant-magnitude current; which, in turn, means the magnitude of the voltage across ARcm is simply proportional to its resistance value.

The DC control voltage provided at terminal OTc is negative with respect to output terminal OTb; which means that, at the peak of current-flow through power rectifier PRb2, this negative DC control voltage is transferred to capacitor Ccm via rectifier Rcm. Thus, the magnitude of the DC control voltage developing across capacitor Ccm will be substantially equal to that of the voltage developing across FCcm; which is to say that the DC control voltage developing across capacitor FCcm will also, in effect, be present across capacitor Ccm.

As the absolute magnitude of the DC control voltage increases beyond a certain minimum level, transistor BQ starts to conduct; whereafter its degree of conduction will increase with increasing absolute magnitude of the DC control voltage. Thus, as the absolute magnitude of the DC control voltage is increased above said certain minimum level, more and more leakage current will be drawn away from bias capacitor Cb by way of resistor Rn, eventually to a point where transistor BQ is fully conductive; at which point resistor Rn is effectively parallel-connected with resistor R1; at which point, in turn, the magnitude of the inverter's output current (power) will reach its maximum level. Hence, a wide range of power output control is provided via adjustable resistor ARcm.

The resistance value of resistor Ra2 is selected such that the ON-time of transistor Qa corresponds to nearly a 50% duty-cycle. Then, with transistor AQ non-conducting, the resistance value of Rb2 is selected such as to result in an inverter output current of magnitude such as to provide for a high-frequency voltage across the tank-capacitor that is equal (or slightly larger) in magnitude than that of the voltage across the fluorescent lamps under normal lamp operation.

With adjustable resistor ARcm set at minimum value, the resistance value of resistor R1 is selected such as to result in a lamp operating current of a magnitude substantially below that of the maximum desired lamp operating current.

With adjustable resistor ARcm set at maximum value, the value of resistor Rn is selected such as to provide lamp operating current of the maximum desired magnitude.

Under the condition of normal lamp loading of the LC circuit, the RMS magnitude of the voltage provided to the lamp cathodes is so selected as to provide for proper cathode heating. Thus, as the circuit is initially powered, even though the lamps have not yet ignited, the cathodes are provided with a heating voltage of RMS magnitude approximately appropriate for proper cathode heating; yet, the magnitude of the high-frequency voltage then provided across the lamps is too low to cause lamp ignition. However, by action of the trigger means consisting principally of elements Rr, Ct, Dt and Rt, after about one second (and about once each second thereafter), a current pulse of about 10 milli-second duration will be provided to the base of transistor AQ, thereby making this transistor conduct for a period of about 10 milli-seconds. During this 10 milli-second period, the magnitude of the high-frequency voltage across the tank-capacitor will increase substantially, and the lamps will ignite.

During the 10 milli-second period, the magnitude of the cathode heating voltages also increases substantially, thereby aiding in lamp ignition. However, on an integrated RMS basis, this brief period of increased-magnitude cathode heating voltage is of little consequence.

As soon as the lamps ignite, lamp current will start to flow; and, by way of transformer LCST, transistor AQ will now become conducting on a 50% duty-cycle basis; which implies that the 10 milli-second pulses that will continue to be provided every second or so will be of little consequence.

If the lamps were to be disconnected, however, the repeatedly provided 10 milli-second pulses will assure that affirmative lamp ignition will occur as soon as fully functional lamps are re-connected.

As long as transistor AQ is kept conductive, the fluorescent lamps will be powered in a normal manner; and the relative magnitude of the lamp current then flowing will depend on the particular setting of adjustable resistor ARcm.

Figure 2:
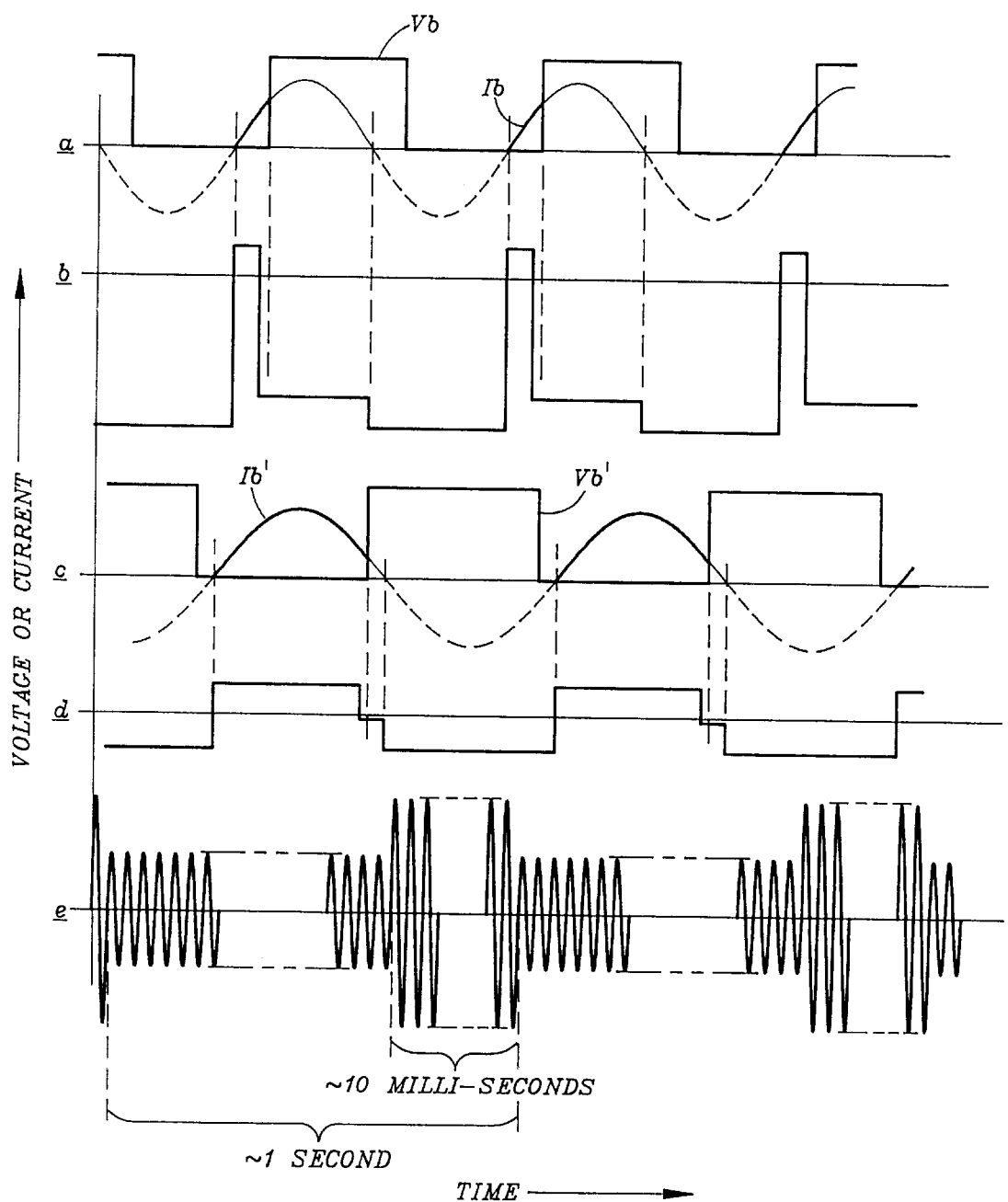
FIG. 2 illustrates waveshapes of various high frequency voltages and currents present within the circuit during different modes of operation.

FIG. 2 depicts various voltage and current waveforms associated with the circuit of FIG. 1.

For a situation with no loading presented to the high-Q LC circuit—that is, with the lamps disconnected, or before the lamps have ignited—FIG. 2a shows the collector-to-emitter voltage Vb of transistor Qb and the corresponding inverter output current Ib. The part of Ib actually flowing through transistor Qb in the forward direction is shown in heavy solid line, the part of Ib flowing through commutating diode CDa is showed in light solid line, and the part of Ib flowing through either Qa or CDb is shown in light dashed line.

FIG. 2b shows the base-emitter voltage of transistor Qb as it corresponds to the waveforms of FIG. 2a.

For a situation where the LC circuit is substantially fully loaded by the two fluorescent lamps, FIG. 2c shows the collector-to-emitter voltage Vb' of transistor Qb and the corresponding inverter output current Ib'. The part of Ib' actually flowing through transistor Qb in the forward direction is shown in heavy solid line, the part of Ib' flowing through commutating diode CDa is showed in light solid line, and the part of Ib' flowing through either Qa or CDb is shown in light dashed line.

FIG. 2d shows the base-emitter voltage of transistor Qb as it corresponds to the waveforms of FIG. 2c.

FIG. 2e shows the waveshape of the high-frequency voltage present across the tank-capacitor under the condition of an unloaded LC circuit: a continuous substantially sinusoidal voltage of a relatively low magnitude, interrupted once each second with a 10 milli-second long burst of relatively high-magnitude substantially sinusoidal voltage.

Additional Comments a) Detailed information relative to a fluorescent lamp ballast wherein the fluorescent lamp is powered by way of a series-excited parallel-loaded L-C resonant circuit is provided in U.S. Pat. No. 4,554,487 to Nilssen.

b) The instantaneous peak-to-peak magnitude of the squarewave output voltage provided by the half-bridge inverter between junctions Jq and Jc is substantially equal to the instantaneous magnitude of the DC supply voltage.

c) Saturable current transformers SCTa and SCTb require only a miniscule voltage across their primary windings. Hence, the magnitude of the voltage-drop between junctions Jq & Jx is substantially negligible, and the inverter's full output voltage is therefore effectively provided across the LC circuit, which consists of tank-capacitor C and tank-inductor L.

d) In FIG. 2, the inverter frequency associated with the waveforms of FIGS. 2a and 2b is substantially higher than that associated with FIGS. 2c and 2d.

Also, current Ib is nearly 180 degrees out of phase with the fundamental frequency component of voltage Vb, while current Ib' is almost in phase with voltage Vb'.

e) In the situation associated with the waveform of FIG. 2b, the magnitude of the voltage "seen" by the secondary winding of saturable current transformer SCTb is about five times as high as that "seen" by the same secondary winding in the situation associated with FIG. 2d.

Correspondingly, the duration of the transistor ON-time in the situation associated with FIG. 2d is about five times longer than the transistor ON-time in the situation associated with the waveform of FIG. 2b.

f) As may be noticed in FIG. 2a, transistor Qb ceases to conduct in its forward direction while a substantial amount of current is still flowing from the inverter's output. After transistor Qb has ceased to conduct, the inverter's output current will continue to flow until the energy in the tank inductor has dissipated itself. However, the output current will continue its flow through commutating diode CDa, thereby discharging its energy into the DC power supply.

g) Forward conduction of a transistor is defined as current flowing, with the aid of forward base drive current, directly between the collector and the emitter; which, in case of transistor Qb for, instance, means that forward current is defined as positive current flowing from its collector to its emitter while drive current is being provided to its base.

A transistor's ON-time is defined as the period during which it conducts current in the forward direction.

h) In FIG. 2 it is noted that the fundamental frequency of the waveforms depicted in FIGS. 2c and 2d is lower by a certain factor as compared with the frequency associated with the waveforms of FIGS. 2a and 2b; yet the indicated duration of transistor ON-time associated with the waveforms of FIGS. 2a and 2b is shorter by a much larger factor as compared with the indicated duration of transistor ON-time associated with the waveforms of FIGS. 2c and 2d.

In fact, when the transistor ON-time is shortened by a given proportion, the fundamental frequency of the inverter's output voltage increases by a much smaller proportion. In instant case, with the Qb transistor's ON-time shortened by a factor of about five, the inverter frequency increased only by a factor of about 1.3: from about 30 kHz to about 40 kHz.

i) The time constant associated with each bias capacitor and its associated leakage resistance means is normally longer than a complete cycle of the high frequency inverter output voltage, and it is typically on the order of several such complete cycles.

For instance, for a situation where the power line input voltage is 120 Volt/60 Hz, the frequency of the inverter output voltage/current is on the order of 30 kHz, and the total inverter power output falls in the range between 10 and 100 Watt, the capacitance values of bias capacitors Ca and Cb might reasonably be in the range from one to ten microFarad, the resistance value of resistor Ra2 might reasonably be in the range between 10 and 100 Ohm, the resistance value of resistor Rb2 might reasonably be in the range between 1000 to 10,000 Ohm, the resistance value of resistor R1 might reasonably be in the range between 10 and 100 Ohm, and the resistance value of resistor Rn might reasonably be in the range between 1 and 10 Ohm.

In general, the magnitude of the bias voltage on the bias capacitors is responsive to the average magnitude of the inverter's output current—normally as averaged over at least a full cycle of this output current.

j) With power input terminals PITa and PITb connected with an ordinary electric utility power line, the various components of the circuit arrangement of FIG. 1 are each electrically connected with earth ground by way of those power input terminals.

k) A key feature of the power-line-operated electronic ballast arrangement disclosed herein is that control of the amount of light provided by the ballasted lamps is effected by providing, between one of the power line conductors and a single control input terminal, an adjustable control voltage. Thus, a dimming-capable ballast made in accordance with instant application need only have three input terminals: (i) two AC power line input terminals for connection with a regular AC power line voltage; and (ii) a single control input terminal. Control of light output is then attained by providing a control voltage between the control input terminal and one of the AC power line input terminals.

In this connection, it is important to note that the single control input terminal is galvanically connected with the ballast circuitry down-stream of the power line rectifiers connected with the AC power line terminals (i.e., rectifiers PRa1, PRa2, PRb1, PRb2); which down-stream circuitry, by virtue of its connection with the power line rectifiers, is not electrically isolated from earth ground, yet will exhibit voltage of significant magnitudes with respect to earth ground.

Also, it is important to note that the power line conductors on which AC power line voltage is provided from an electric utility power plant are both electrically referenced-to and connected with earth ground.

That is, as be well known to a person having but ordinary skill in the particular art pertinent hereto, ordinary AC power line conductors are indeed electrically referenced-to and connected with earth ground. Thus, it would be totally improper to make any direct electrical connection between one of the conductors located down-stream of the power line rectifiers (PRa1, PRa2, PRb1, PRb2), which is to say: on the side where the B– bus and B+ bus are located. In particular, it would be entirely improper to make a direct electrical connection between the B– bus and either one of the AC power line conductors.

k) Although not expressly shown in FIG. 1, it is emphasized that fluorescent lamps FL1 and FL2 are connected with terminals POT1 and POT2 by way of lamp socket means of a type that has electrical terminal means that are non-accessible to a person's fingers or the like. However, the terminal means of the fluorescent lamps themselves are of a type that does permit a person to touch them directly, provided they are not inserted into their sockets.

Thus, in a situation where the circuit arrangement of FIG. 1 is used as a fluorescent lamp ballasting means, and under otherwise ordinary circumstances, the only way that a person is able to get exposed to a ground-fault current from the circuit arrangement of FIG. 1 is by holding on to the terminals at one end of a fluorescent lamp while inserting the other end into a lamp socket connected with the POT2 or the "hot" terminal.

l) In the circuit arrangement of FIG. 1 there are two distinctly different kinds of magnitude-limiting of the inverter's output current. One is the ordinary kind associated with the natural characteristics of a series-excited parallel-loaded resonant LC circuit; another is due to the action of the control circuit associated with leakage resistors Ra2 and Rb2, as well as auxiliary transistor AQ.

m) Due to basic factors related to magnetic hysteresis and leakage iductance, lamp current sensing transformer LCST requires the lamp current to have a certain minimum magnitude before producing an output signal of magnitude adequate to cause auxiliary transistor AQ to become conductive. Hence, there is a minimum threshold level automatically built into the control means used for sensing lamp current. This threshold level may readily be changed, for instance by changing the number of turns on primary winding PW, or by placing a shunting impedance across secondary winding SW.

n) In the control circuit related to transistor AQ, there are to main control effects: (i) one associated with the fact that the magnitude of the bias voltage on capacitor Cb tends to vary around an average level as a function of the average absolute magnitude of the inverter's output current, and (ii) one associated with the fact that the average level around which the bias voltage varies may itself be varied, such as by switching AQ ON or OFF, or by varying the magnitude of the base current provided to transistor BQ.

o) Without any substantial loading on the LC circuit, its Q-factor is quite high, and—absent proper control measures—the magnitude of the voltage developing across the tank-capacitor tends to become destructively high.

A large-magnitude voltage across the tank-capacitor must by necessity be associated with an inverter output current of correspondingly large magnitude. However, a large-magnitude inverter output current will cause a correspondingly high-magnitude negative bias on both bias capacitors, but—absent lamp current of magnitude sufficient to place transistor AQ into conduction—particularly on bias capacitor Cb: the two bias capacitors have to provide a positive current of magnitude proportional to the average absolute magnitude of the inverter's output current; which means that the magnitude of the negative bias voltage will have to increase with increasing magnitude of the inverter output current.

It is this negative feedback feature, which relates to negative feedback of the rectified average magnitude of the inverter's output current (i.e., DC negative feedback), that provides for stable controllable operation of a self-oscillating inverter whose output is connected across an unloaded high-Q series-connected LC circuit.

p) In fact, the circuit arrangement of FIG. 1 may be defined as an inverter that is loaded by way of a high-Q tuned LC circuit and arranged to self-oscillate by way of positive AC feedback derived from the inverter's instantaneous output current (and/or voltage) while at the same time arranged to provide for controllable-magnitude output current (and/or voltage) by way of negative DC feedback derived from the average absolute magnitude of the inverter's output current (and/or voltage).

q) So as to fully reset the saturable cores each cycle, diodes SDa and SDb should each have a relatively high-magnitude forward voltage drop, such as might be obtained by using two or three ordinary diodes in series. However, instead of using special diodes with high-magnitude forward voltage drops, it is acceptable to use ordinary diodes with added series-resistors, thereby effectively to increase their forward voltage drops.

r) The magnitude of the voltage provided across auxiliary winding AW is not critical, except for the fact that it has to be sufficiently large to allow the magnitude of the DC voltage developing across capacitor Ct to get high enough to cause Diac Dt to reach its break-over voltage of 30 Volt or so.

s) Some of the values associated with operating the ballast with the kind of waveform indicated by FIG. 2e are as follows: (i) relaxed specifications for the tank-inductor; (ii) relaxed specifications for the tank-capacitor; (iii reduced glow current prior to lamp ignition, thereby providing increased lamp life; (iv) improved lamp starting; (v) reduced idling power; and (vi) cost-effective compliance with U.L. specifications related to ground-fault current.

t) The RMS magnitude of the cathode heating voltage, which voltage is provided to each of the lamps' thermionic cathodes by way of cathode heating windings CHW, is such as to provide for proper cathode heating during the period before the lamps ignite, as well as on a continuous basis thereafter.

During the brief pulses provided by way of elements Rr, Ct, Dt and Rt, the RMS magnitude of the cathode heating voltage is increased to about twice normal value. However, since the duration of each of these pulses is so brief (about 10 milli-seconds) compared with the duration of each of the periods between such pulses (about 1000 milli-seconds), the net effect on the temperature of the cathodes is negligible. However, with respect to lamp ignition, the effect is substantial and beneficial. The briefly elevated RMS magnitude of the cathode voltage gives rise to ionization of the lamp gas along the cathodes' surfaces, thereby greatly facilitating the ignition of the main gas columns of the lamps.

u) With the series-connected LC circuit unloaded, the RMS magnitude of the high-frequency output voltage, as provided at output terminals POT1/POT2, is determined by the value of resistor Rb2, except for the brief one millisecond intervals (see FIG. 2e). During these one millisecond intervals, the RMS magnitude of the high-frequency output voltage is determined by the effective resistance values of R1 and Rn.

v) In the arrangement of FIG. 1, the frequency of the current provided to the fluorescent lamps changes with the amount of power provided to the lamps: the higher the amount of power, the lower the frequency. This effect is directly related to the situation illustrated in FIG. 2: the higher the negative bias on bias capacitor Cb (see FIG. 2b versus FIG. 2d), the higher the frequency, and the less the power provided to the load.

Thus, as the resistance value of adjustable resistor ARcm in increased, the inverter's frequency decreases.

w) In some situations it would be advantageous to substitute continuously adjustable resistor ARcm with a stepwise adjustable resistor.

It is noted that the magnitude of the control power required to be provided from output terminals OTc and OTb is miniscule, even if a substantial number of loaded ballasts were to be connected therewith. Thus, the power dissipation associated with adjustable resistor ARcm is modest.

x) The main purpose of resistor Rm is that of mitigating any effect due to excessive leakage of Diac Dt. However, it is also useful in minimizing effects of unintended transients that may be picked up by lamp current sensing transformer LCST.

y) In FIG. 1, although only a single ballast (or lighting fixture) is shown as being controlled by light control means LCM, it is emphasized that this single light control means may control any number of ballasts (or lighting fixtures) connected with the output terminals (OTa/OTb/OTc) thereof.

In particular, it is anticipated that a single light output control means (LCi) be used in lieu of an ordinary ON/OFF wall switch to control the ON/OFF as well as dimming of a whole bank of fluorescent lighting fixtures, such as may be installed in the ceiling of an office.

z) A key feature of the power-line-operated electronic ballast arrangement disclosed herein is that control of the amount of light provided by the ballasted lamps is effected by providing, between one of the power line conductors and a single control input terminal, an adjustable control voltage. Thus, a dimming-capable ballast made in accordance with instant application need only have three input terminals: (i) two AC power line input terminals for connection with a regular AC power line voltage; and (ii) a single control input terminal. Control of light output is then attained by providing a control voltage between the control input terminal and one of the AC power line input terminals.

In this connection, it is important to note that the single control input terminal is galvanically connected with the ballast circuitry downstream of the power line rectifiers connected with the AC power line terminals (i.e., rectifiers PRa1, PRa2, PRb1, PRb2); which down-stream circuitry, by virtue of its connection with the power line rectifiers, is not electrically isolated from earth ground, yet will exhibit voltage of significant magnitudes with respect to earth ground.

Also, it is important to note that the power line conductors on which AC power line voltage is provided from an electric utility power plant are both electrically referenced-to and connected with earth ground.

That is, as be well known to a person having but ordinary skill in the particular art pertinent hereto, ordinary AC power line conductors are indeed electrically referenced-to and connected with earth ground. Thus, it would be totally improper to make any direct electrical connection between one of the conductors located down-stream of the power line rectifiers (PRa1, PRa2, PRb1, PRb2), which is to say: on the side where the B− bus and B+ bus are located. In particular, it would be entirely improper to make a direct electrical connection between the B− bus and either one of the AC power line conductors.

What is claimed is:

1. An arrangement comprising:
a source operative to provide: (i) an AC power line voltage between a pair of power line terminals; and (ii) a control voltage between a control output terminal and one of the power line terminals; the source including a control means operative to effectuate adjustment of the control voltage; and
an electronic ballast having: (i) two power input terminals connected with the power line terminals and one control input terminal connected with the control output terminal; (ii) a set of ballast output terminals connected, via a tuned LC circuit, with a gas discharge lamp and operable to supply an alternating lamp current thereto, the frequency of the alternating lamp current being many times higher than that of the AC power line voltage and remaining substantially constant during a complete period of the AC power line voltage; and (iii) control circuitry responsive to the control voltage and functional to control the magnitude of the lamp current supplied to the gas discharge lamp and thereby the amount of light generated thereby.

2. The arrangement of claim 1 further characterized in that the frequency of the lamp current is higher than the frequency of the AC power line voltage by a factor of at least 100.

3. The arrangement of claim 1 further characterized in that the control means includes a semiconductor.

4. The arrangement of claim 1 wherein the electronic ballast is further characterized by including a pair of DC terminals between which exists a DC supply voltage; a pulsating voltage of peak absolute magnitude about equal to that of the AC power line voltage existing between one of the DC terminals and one of the power input terminals.

5. The arrangement of claim 1 wherein the electronic ballast is further characterized by having no more than three input terminals.

6. The arrangement of claim 1 wherein the electronic ballast is further characterized by having a pair of DC terminals at which is provided a DC supply voltage and between which are series-connected a pair of transistors.

7. The arrangement of claim 1 wherein: (i) within the electronic ballast exists a pair of DC terminals across which is provided a DC supply voltage; and (ii) the electronic ballast would draw a current of excessively high magnitude from its power input terminals if one of its DC terminals were to be directly connected with one of its power input terminals; excessively high magnitude being defined as a magnitude higher than that of the maximum current drawn from the power line terminals by the power input terminals under a condition where the electronic ballast is powering the fluorescent lamp at its maximum power level.

8. An arrangement comprising:
a source functional to supply: (i) an AC power line voltage between a pair of AC power output terminals; and (ii) a control signal between a control signal output terminal and one of the AC power output terminals; the source otherwise being characterized by including a control sub-assembly connected in circuit with the control signal output terminal as well as with one of the AC power output terminals; the control sub-assembly being operative to effect adjustment of the control signal; and light-generating sub-assembly having lamp power input terminals; and frequency-converting electronic sub-assembly having: (i) AC power input terminals connected with the AC power output terminals; (ii) a control signal input terminal connected with the control signal output terminal; (iii) high-frequency power output terminals connected with the lamp power input terminals, thereby to supply high-frequency lamp current thereto, the frequency of the high-frequency lamp current being distinctly higher than that of the AC power line voltage and staying substantially constant during a complete cycle of the AC power line voltage; and (iv) control circuitry connected with the control signal input terminals and responsive to the control signal provided thereat, thereby to cause the magnitude of the high-frequency lamp current to respond to adjustments of the control signal.

9. The arrangement of claim 8 further characterized in that the light-generating sub-assembly includes a gas discharge lamp.

10. The arrangement of claim 8 wherein the light-generating sub-assembly includes at least two series-connected fluorescent lamps, each having thermionic cathodes.

11. The arrangement of claim 8 wherein the control signal is a unidirectional voltage of adjustable magnitude.

12. An arrangement comprising:

(A) a first sub-arrangement connected with an AC power line voltage such as that present on an ordinary electric utility power line; the first sub-assembly including:
  (i) a pair of power output terminals at which is provided the AC power line voltage; and
  (ii) a control signal source connected with at least one of the power output terminals as well as with a control signal output terminal; the control signal source being operative to provide a control signal between the control signal output terminal and said one of the power output terminals; the control signal source having an adjustment means functional to permit adjustment of the control signal; and (B) a second sub-arrangement having three input terminals, namely: (i) a pair of power input terminals connected with the power output terminals, and (ii) a control signal input terminal connected with the control signal output terminal; the second sub-arrangement being additionally characterized by including a gas discharge lamp providing light by being supplied with a high-frequency alternating current of frequency many times higher than that of the AC power line voltage; for a given amount of light emitted by the gas discharge lamp, the frequency of the alternating lamp current staying substantially constant throughout the duration of a complete cycle of the AC power line voltage; the amount of light provided being responsive to the control signal, such that an adjustment of the control signal causes a corresponding adjustment of the amount of light provided.

13. The arrangement of claim 12 wherein the second sub-arrangement is further characterized in that an alternating lamp current flows through the gas discharge lamp; the frequency of this alternating lamp current being at least 100 times higher than that of the AC power line voltage.

14. The arrangement of claim 12 wherein the second sub-arrangement is characterized in that it does not require to be connected with the first sub-arrangement by more than the three input terminals expressly identified.

15. The arrangement of claim 12 wherein the second sub-arrangement is further characterized in that a rectifier is connected with each one of the three input terminals in such a manner that any current flowing into one of the three input terminals must flow through its associated rectifier.

16. The arrangement of claim 12 wherein the second sub-arrangement is further characterized in that: (i) the control signal is a DC voltage; and (ii) the polarity of this DC voltage is such that the potential present at the control signal output terminal is negative with respect to the potential at said one of the power output terminals.

17. An arrangement comprising:

a first assembly having a first, a second and a third output terminal; the first assembly being further characterized in that: (i) an AC power line voltage is provided between the first and second terminals; and (ii) an adjustable control voltage is provided between the second and third terminals; the control voltage having a magnitude substantially lower than that of the AC power line voltage; and a second assembly having a first, a second and a third input terminal respectively connected with the first, the second and the third output terminal; the second assembly being further characterized by having: (i) a pair of power output terminals supplying an AC lamp current to a gas discharge lamp connected thereto; and (ii) control circuitry responsive to the magnitude of the control voltage in such manner that the magnitude of the control voltage determines the magnitude of the AC lamp current; the AC lamp current being of frequency many times higher than that of the AC power line voltage; the frequency of the AC lamp current staying substantially constant throughout the duration of a complete period of the AC power line voltage.

18. The arrangement of claim 17 wherein: (i) the first assembly has a pair of AC power input terminals connected with a pair of power line terminals across which is supplied said AC power line voltage; and (ii) except via the first, second and third input terminals, the second assembly has no electrical connection with either of the power line terminals.

19. The arrangement of claim 17 wherein the first assembly includes a sub-assembly functional to permit manual adjustment of the magnitude of the control voltage.

* * * * *